US009703443B2

(12) United States Patent
Korn

(10) Patent No.: US 9,703,443 B2
(45) Date of Patent: Jul. 11, 2017

(54) METHOD AND SYSTEM FOR CREATING A FREE-FORM VISUAL USER INTERFACE ELEMENT

(75) Inventor: Peter Alex Korn, Oakland, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1002 days.

(21) Appl. No.: 12/237,862

(22) Filed: Sep. 25, 2008

(65) Prior Publication Data

US 2010/0077329 A1  Mar. 25, 2010

(51) Int. Cl.
*G06F 9/44* (2006.01)
*G06F 3/0481* (2013.01)
*G06F 3/0486* (2013.01)

(52) U.S. Cl.
CPC .............. *G06F 3/0481* (2013.01); *G06F 8/34* (2013.01); *G06F 3/0486* (2013.01); *G06F 8/20* (2013.01); *G06F 8/38* (2013.01)

(58) Field of Classification Search
CPC ...... G06F 1/1626; G06F 1/1694; G06F 3/017; G06F 3/04815; G06F 3/0482; G06F 2200/1637; G06F 2200/1614
USPC ....... 715/780, 762–765, 230, 769, 810, 964, 715/967
See application file for complete search history.

(56) References Cited

U.S. PATENT DOCUMENTS

| 7,448,042 B1* | 11/2008 | Engber ................. G06F 9/4443 719/310 |
| 2002/0080157 A1* | 6/2002 | Chickles et al. .............. 345/700 |
| 2006/0235548 A1* | 10/2006 | Gaudette ......................... 700/83 |
| 2009/0187817 A1* | 7/2009 | Ivashin et al. ................ 715/230 |

FOREIGN PATENT DOCUMENTS

| EP | 0514307 A2 | 11/1992 |
| EP | 0660220 A1 | 6/1995 |

OTHER PUBLICATIONS

Photoshop Lesson 1-Image size, resolution, and mode https://web.archive.org/web/20070429221200/http://www-personal.umich.edu/~weyrbrat/photoshop/lesson1/ (published on Apr. 29, 2007).*
Rob Regan, Best Practices for Accessible Flash Design, Macromedia, Inc., 2005, pp. 1-28.

* cited by examiner

*Primary Examiner* — Rinna Yi
(74) *Attorney, Agent, or Firm* — Kilpatrick Townsend & Stockton LLP

(57) ABSTRACT

A method of creating a free-form visual user interface element includes receiving a command to associate a visual representation of at least one of a set of graphical user interface controller attributes with a free-form visual element, generating instructions defining the at least one of the set of graphical user interface controller attributes, and adapting the instructions to a data structure embodying the free-form visual element. The method also includes attaching the adapted instructions to the data structure to form a free-form visual user interface element.

18 Claims, 3 Drawing Sheets

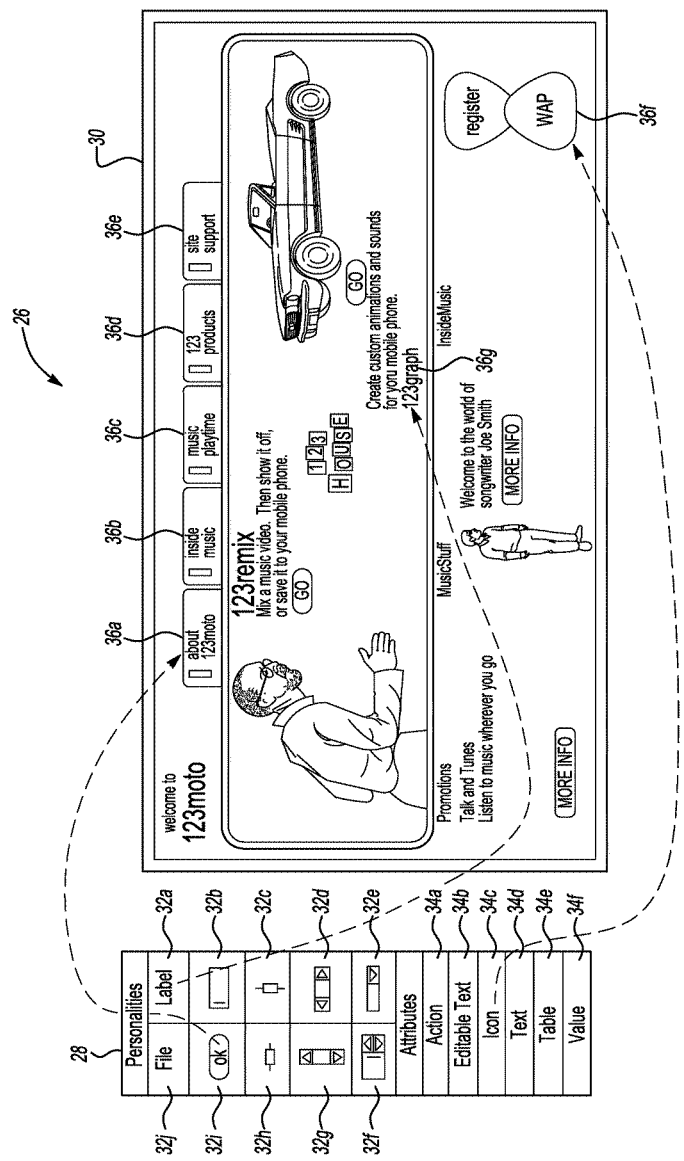

METHOD AND SYSTEM FOR CREATING A FREE-FORM VISUAL USER INTERFACE ELEMENT

BACKGROUND

Model-view-controller (MVC) is an architectural pattern used in software engineering. Certain uses of this pattern may isolate business logic from user interface considerations, resulting in an application where it may be easier to modify either the visual appearance of the application or the underlying business rules without affecting the other.

Referring now to FIG. 1, in MVC, a model 10 represents the information (the data) of the application and the business rules used to manipulate the data, a view 12 corresponds to elements of the user interface such as text, checkbox items, and so forth, and a controller 14 manages details involving the communication to the model 10 of user actions such as keystrokes and mouse movements. As illustrated, method invocations appear in solid line and events appear in dashed line.

The model 10 may encapsulate the application state, respond to state queries, expose application functionality and notify the view 12 of changes. The view 12 may render the model 10, request updates from the model 10, send user gestures to the controller 14 and allow the controller 14 to select the view 10. The controller 14 may define application behavior, maps user actions to updates for the model 10 and select the view 12 for response.

Swing is a platform-independent, MVC graphical user interface (GUI) framework for Java. It follows a single-threaded programming model, and possesses the following traits:

Platform Independence

Swing is platform independent both in terms of its expression (Java) and its implementation (non-native universal rendering of widgets).

Extensibility

Swing is a partitioned architecture, which allows for the "plugging" of various custom implementations of specified framework interfaces. For example, users may provide their own custom implementation(s) of these components to override the default implementations. In general, Swing users may extend the framework by extending existing (framework) classes and/or providing alternative implementations of core components.

Component-Oriented

Swing is a component-based framework. A component is a well-behaved object with a known/specified characteristic pattern of behavior. Swing objects asynchronously fire events, have "bound" properties and respond to a well-known set of commands (specific to the component.) Specifically, Swing components are Java Beans components, compliant with the Java Beans Component Architecture specifications.

Customizable

Given the programmatic rendering model of the Swing framework, fine control over the details of rendering of a component may be possible in Swing. As a general pattern, the visual representation of a Swing component is a composition of a standard set of elements, such as a "border," "inset," decorations, etc. Users may programmatically customize a standard Swing component (such as a JTable) by assigning specific borders, colors, backgrounds, opacities, etc., as the properties of that component. The core component will then use these properties (settings) to determine the appropriate renderers to use in painting its various aspects. It is also, however, completely possible to create unique GUI controls with customized visual representation.

Configurable

Swing's reliance on runtime mechanisms and indirect composition patterns allows it to respond at runtime to fundamental changes in its settings. For example, a Swing-based application can change its look and feel at runtime. Further, users can provide their own look and feel implementation, which allows for uniform changes in the look and feel of existing Swing applications without any programmatic change to the application code.

Lightweight UI

Swing's configurability results from not using the native host operating system's (OS's) GUI controls for displaying itself. Swing "paints" its controls programmatically through the use of Java 2D APIs, rather than calling into a native user interface toolkit. Thus, a Swing component does not have a corresponding native OS GUI component, and is free to render itself in any way that is possible with the underlying graphics APIs.

Swing components typically rely on an Abstract Window Toolkit (AWT) container because (Swing's) JComponent extends the AWT's container. This allows Swing to plug into the host OS's GUI management framework, including the device/screen mappings and user interactions, such as key presses or mouse movements. Swing "transposes" its own (OS agnostic) semantics over the underlying (OS specific) components. So, for example, every Swing component paints its rendition on the graphic device in response to a call to component.paint( ), which is defined in the AWT container. But unlike AWT components, which delegated the painting to their OS-native "heavyweight" widget, Swing components are responsible for their own rendering.

This transposition and decoupling is not merely visual, and extends to Swing's management and application of its own OS-independent semantics for events fired within its component containment hierarchies. Generally speaking, the Swing Architecture delegates the task of mapping the various flavors of OS GUI semantics onto a simple, but generalized, pattern to the AWT container. Building on that generalized platform, it establishes its own GUI semantics in the form of the JComponent model.

Loosely-Coupled/MVC

The Swing library makes use of the MVC software design pattern, which conceptually decouples the data being viewed from the user interface controls through which it is viewed. Because of this, most Swing components have associated models (which are specified in terms of Java interfaces), and the programmer can use various default implementations or provide their own. The framework provides default implementations of model interfaces for all of its concrete components.

Typically, Swing component model objects are responsible for providing a concise interface defining events fired, and accessible properties for the (conceptual) data model for use by the associated JComponent. Given that the overall MVC pattern is a loosely-coupled collaborative object relationship pattern, the model provides the programmatic means for attaching event listeners to the data model object. Typically, these events are model centric, e.g., a "row inserted" event in a table model, and are mapped by the JComponent specialization into a meaningful event for the GUI component. For example, the JTable has a model called TableModel that describes an interface for how a table would access tabular data. A default implementation of this operates on a two-dimensional array.

The view component of a Swing JComponent is the object used to graphically "represent" the conceptual GUI control. A distinction of Swing, as a GUI framework, is in its reliance on programmatically-rendered GUI controls (as opposed to the use of the native host OS's GUI controls). This distinction may be a source of complications when mixing AWT controls, which use native controls, with Swing controls in a GUI.

The Swing framework does not require the creation of custom models, as the framework provides a set of default implementations that are transparently, by default, associated with the corresponding JComponent child class in the Swing library. In general, only complex components, such as tables, trees and sometimes lists, may require the custom model implementations around the application-specific data structures.

In terms of visual composition and management, Swing favors relative layouts (which specify the positional relationships between components) as opposed to absolute layouts (which specify the exact location and size of components).

SUMMARY

A method of creating a free-form visual user interface element includes receiving a command to associate a visual representation of at least one of a set of graphical user interface controller attributes with a free-form visual element, generating instructions defining the at least one of the set of graphical user interface controller attributes, adapting the instructions to a data structure embodying the free-form visual element, and attaching the adapted instructions to the data structure to form a free-form visual user interface element.

A system for creating a free-form visual user interface element includes one or more computers. The one or more computers are configured to receive a command to associate a user interface controller attribute with a free-form visual element, generate instructions defining the user interface controller attribute, and adapt the instructions to a data structure embodying the free-form visual element. The one or more computers are also configured to attach the adapted instructions to the data structure to form a free-form visual user interface element.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 4 is a screen shot of an example user interface for creating a visual program.

DETAILED DESCRIPTION

Visual designers may create visual applications by combining bitmap or vector-based artwork with a set of animated behaviors, and then connect this to programming logic (frequently created by non-visual design specialists). This style of visual interface development may make use of stock components, e.g., the Swing look and feel classes or Abstract Window Toolkit. A designer may also compose a collection of artwork, such as bitmap images from Adobe Photoshop or vector graphics from Adobe Illustrator, and then apply a collection of graphic transforms to those objects under a set of conditions. For example, a selected collection of images of a piece of paper moving from one folder to another may be animated to visually indicate a copy action. Alternatively, a visual designer may imbue their artwork with stock personalities, such as the personality of a button or a slider, and/or attributes, such as the accessible description of the object or the accessible value of something that is behaving like a slider. As discussed below, this may be accomplished within the tool used by the visual designer to create their visual application.

Figure 1:
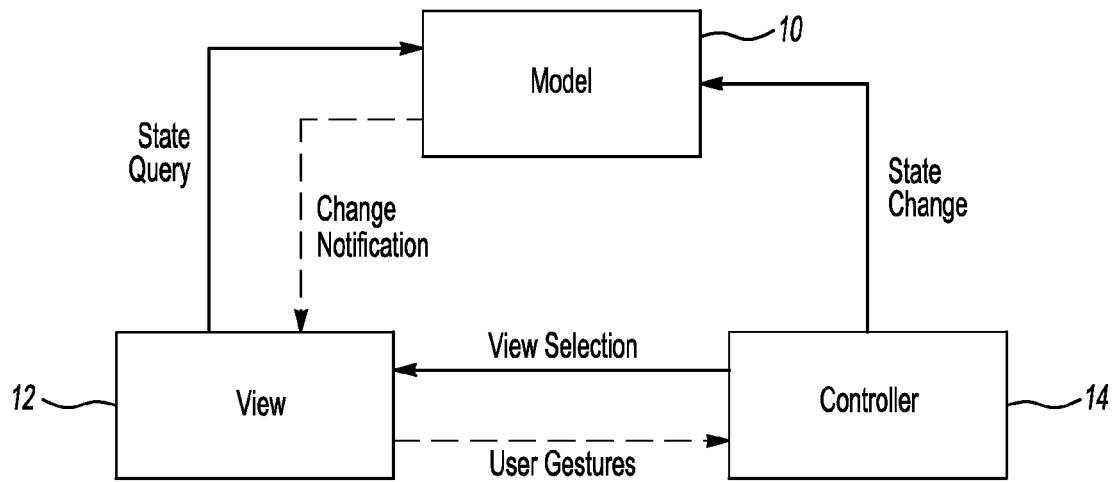
FIG. 1 is a block diagram of a model-view-controller architectural pattern.
Figure 2:
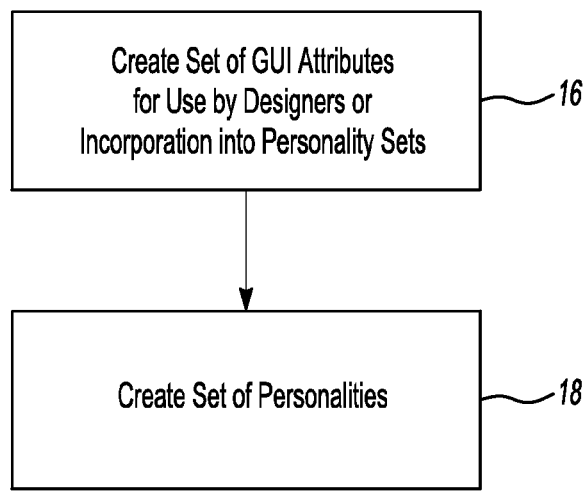
FIGS. 2 and 3 are flow charts depicting portions of algorithms for creating a visual program.

Referring now to the algorithm of FIG. 2, a set of predefined attributes, such as emitter of actions/signals, implementer of the accessibility API, provider of component information, provider of accessible value information, etc., are created as indicated at 16. As indicated at 18, these attributes may be composed into one or more sets of predefined personalities, such as the button personality, the slider personality, the tab personality, etc.

The selection of attributes—and their collection into personalities—may be performed by the developer of the tool as appropriate to the application domain. For example, the minimum set of personalities for realizing a typical graphical user interface application may include buttons, checkboxes, radio buttons, sliders, static and editable text fields, combo-boxes, images and tabbed panes. The set of attributes may be the decomposition of these personalities: "contains static text," "contains editable text," "is clickable," "provides one of a range of values," etc. In order to support accessibility needs, there may be a minimum set of accessibility attributes including "accessible name," "accessible role," "accessible states," etc. Further, to support an accessible graphical user interface (GUI), the GUI personalities may already have accessibility attributes built into them.

Figure 3:
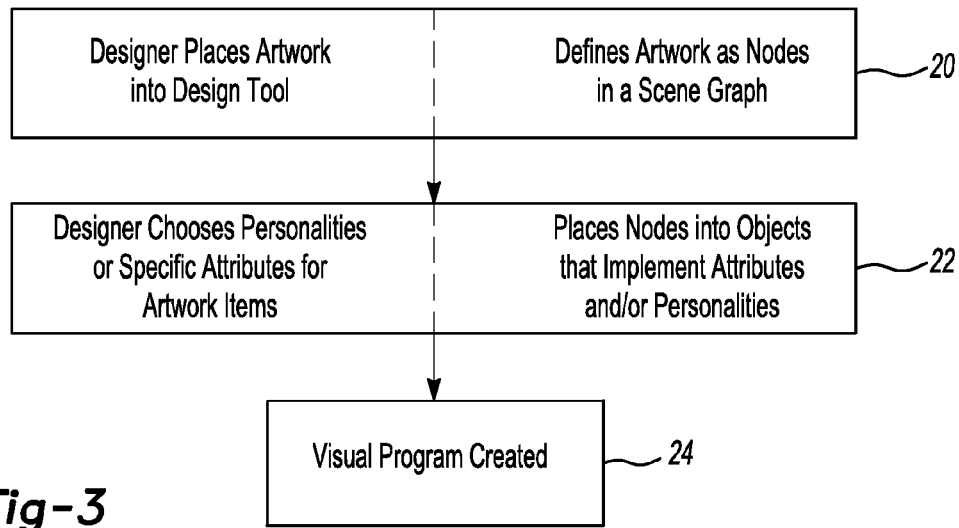

Referring now to the algorithm of FIG. 3, the designer may place their artwork into the design tool which, in the embodiment of FIG. 3, automatically defines them as nodes within a scene graph as indicated at 20.

As known to those of ordinary skill, a scene graph may be a general data structure commonly used by vector-based graphics editing applications and modern computer games. Some scene graphs are structures that arrange the logical and often (but not necessarily) spatial representations of graphical scenes.

A scene graph may be a collection of nodes in a graph or tree structure. A node may have many children but often only a single parent, with the effect of a parent apparent to all its child nodes. An operation applied to a group may automatically propagate its effect to all of its members. In certain programs, associating a geometrical transformation matrix at each group level and concatenating such matrices together may be an efficient and natural way to process such operations. A common feature, for example, is the ability to group related shapes/objects into a compound object which can then be moved, transformed, selected, etc., as easily as a single object. In some scene graphs, a node may have a relation to any node including itself, or at least an extension that refers to another node.

As indicated at 22, the designer may associate the predefined personalities and/or attributes with their artwork as they build their visual application by, for example, placing the nodes into objects that implement the predefined attributes and/or personalities.

As indicated at 24, the visual program is thus created.

Referring now to FIG. 4, an embodiment of a user interface 26 for associating predefined personalities and/or attributes with graphic elements includes a palette 28 and a visually rich user interface 30 under development. The palette 28 includes a plurality of personalities 32n (32a-32j). As discussed above, each of the personalities 32n is a composition of one or more attributes. In the embodiment of FIG. 4, the personality 32a represents a label, the personality 32b represents a text box, the personality 32d represents a horizontal slide bar, the personality 32g represents a button, etc. The palette 28 also includes a plurality of attributes 34n (34a-34f). In the embodiment of FIG. 4, the attribute 34b represents editable text, the attribute 34c represents an icon, the attribute 34e represents a table, etc. Any suitable attributes and personalities, however, may be used.

The user interface 30 comprises a number of free-form visual elements 36n (36a-36g). As discussed above, these free-form visual elements 36n may be, for example, bitmap images from Adobe Photoshop or vector graphics from Adobe Illustrator. In the embodiment of FIG. 4, the free-form visual elements 36a-36e are intended to behave as buttons. The free-form visual element 36f is intended to behave as an icon. The free-form visual element 36g is intended to behave as a label.

To imbue the respective free-form visual elements 36n with their intended functional properties, the designer may select a desired personality 32n or attribute 34n from the palette 28 and drag-and-drop it onto one of the free-form visual elements 36n. For example, the designer may drag-and-drop the label personality 32a onto the free-form visual element 36g ("123graph"), the designer may drag-and-drop the button personality 32g onto each of the free-form visual elements 36a-36e, the designer may drag-and-drop the icon attribute 34c onto the free-form visual element 36f, etc. The free-form visual elements 36a-36g thus take on the respective functional properties associated with the personalities 32n and/or attributes 34n dropped onto them.

A general Java/JavaFX object that is able to contain generic attributes or a specific Java/JavaFX object that corresponds to the specific personality in question, for example, may thus be created. Such an object may be ready to receive associated code that is part of the data structure in memory associated with the visual object imported from another application. As such, attribute holder and personality holder objects may be created into which graphics are placed, for example, as nodes in a scene graph. Any suitable technique, however, may be used.

Figure 5:
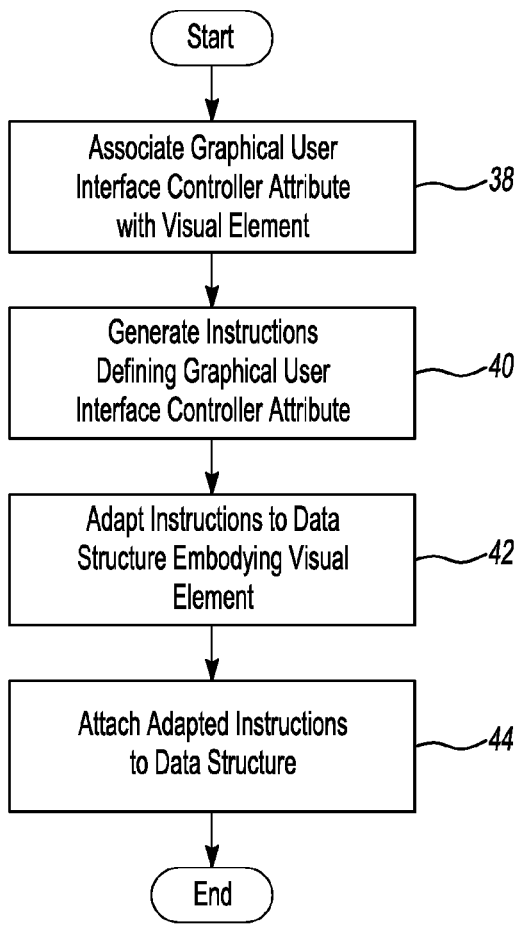
FIG. 5 is a flow chart depicting an algorithm for creating a visual element.

Referring now to the algorithm of FIG. 5, a command is received to associate a visual representation of a graphical user interface controller attribute with a free-form visual element as indicated at 38. As an example, a user may move a mouse over a palette containing icons representing a set of graphical user interface controller attributes, hold a mouse button down while over one of them, move/drag the mouse until it is over a free-form visual element and finally release the mouse. As another example, a user may bring keyboard focus to a palette containing icons representing a set of graphical user interface controller attributes, e.g., with the F6 key, bring focus to one of the representations of the set of graphical user interface controller attributes, e.g., with the arrow keys, and select the desired representation of the graphical user interface controller attribute(s), e.g. with the spacebar or <CR> key. The user may then bring focus to the pane containing the free-form visual elements, e.g. with the F6 key, bring focus to a specific free-form visual element, e.g., with the TAB key, and finally imbue the focused visual element with the previously selected user interface controller attribute(s), e.g., with the spacebar or <CR> key. As yet another example, a user may right click on a mouse, select "imbue" from a menu and a text description of the graphical user interface controller attribute(s) from a submenu. As still yet another example, a user may input Ctrl-F10 or some other keystroke to bring up a context menu, arrow to select "imbue" from the menu and then arrow to select a text description of the graphical user interface controller attribute(s) from a submenu.

As indicated at 40, instructions defining the graphical user interface controller attribute are generated. In one example algorithm, a generic code template for the user-chosen graphical user interface controller attribute(s) may be stored in a file/memory as XML tagged code or a collection of XML tagged code fragments (one per attribute). The generic code template for the user-chosen graphical user interface controller attribute(s) may then be looked up and passed onto 42 discussed below. Other suitable code and/or techniques, however, may be used.

As indicated at 42, the instructions are adapted to a data structure embodying the free-form visual element. In one example algorithm, the tagged code may be inspected and, for each tag indicating adaptation is needed (e.g., an XML tag noting that an adapter needs to replace that tag with generated code), the associated information in the free-form visual element containing the information needed for adaptation may be looked up. The adaptation may then be made.

As an example, for the controller attribute "get bounds" from the collection of attributes relating to the Accessible Component interface of the java accessibility.* API, the static bounds of the free-form visual element may be determined or a call to a function on the free-form visual element that returns this may be slotted in. In one example, the XML code fragment

```
Rectangle getBounds( ) {
    return <variable attribute="bounds" type="Rectangle">;
}
```
may be turned into
```
Rectangle getBounds( ) {
    return new Rectangle (0, 0, 200, 300);
}
```
Of course, any suitable technique may be used.

As indicated at 44, the adapted instructions are attached to the data structure to form a user interface element. In one example algorithm, assuming the visual elements are nodes in a scene graph, the free-form visual element in the scene graph may be modified by modifying the scene graph node data structure to indicate that the node is a visual user interface element that has attribute methods on it, adding each of the adapted instructions from the previous step to the scene graph node data structure or modifying the root of the scene graph to indicate that one or more nodes within it are visual user interface elements (this may be important for certain types of controller attributes such as those associated with keyboard focus & handling keyboard input).

Once the program is created, at runtime it may behave similar to any other component-based application, e.g., Swing application, from the point of view of either an accessibility framework or for standard behaviors, e.g., keyboard focus and operation behavior for buttons and tab components, etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of comprising:
    facilitating a display, by a computing system, of a user interface including a free-form visual element and a plurality of graphical user interface (GUI) controls, wherein each GUI control of the plurality of GUI controls is associated with a GUI control type, and wherein each GUI control includes one or more GUI controller attributes that define a functional property that is implemented at runtime;
    receiving, by the computing system, input indicative of a selection a GUI control of the plurality of GUI controls to associate with the free-form visual element;
    generating, by the computing system, executable instructions from a generic code template, wherein the executable instructions define at least one of the one or more GUI controller attributes of the selected GUI control;
    adapting, by the computing system, the executable instructions to a data structure representing the free-form visual element by replacing one or more tagged attributes of the executable instructions with generated code specific to the free-form visual element; and
    attaching, by the computing system, the adapted executable instructions to the data structure representing the free-form visual element to create a user interface element,
    wherein the user interface element has the same visual appearance as the free-form visual element associated with the selected GUI control, wherein the user interface element is configured to execute, at runtime, the adapted executable instructions to implement the functional property associated with the selected GUI control.

2. The method of claim 1, further comprising defining at least one gesture that is indicative of the selection of the GUI control.

3. The method of claim 2, wherein the at least one gesture includes a drag-and-drop gesture.

4. The method of claim 1, wherein the one or more GUI controller attributes comprises accessibility functions supporting interaction with an accessibility framework as a control of the GUI control type.

5. The method of claim 1, wherein the free-form visual element is associated with a node of a scene graph.

6. The method of claim 1, wherein the one or more GUI controller attributes includes an accessible name, an accessible role, and accessible state information.

7. The method of claim 1, wherein the GUI control includes one of a button control GUI control, a slider control GUI control, a tab control GUI control, a checkbox control GUI control, or a combo-box control GUI control.

8. The method of claim 1, wherein the user interface is configured to generate a visual program, and wherein the free-form visual element is one of a bitmap image or a vector image.

9. A system comprising:
    one or more processors; and
    one or more non-transitory computer readable storage mediums containing instructions which when executed on the one or more processors, cause the one or more processors to perform operations including:
        facilitating a display of a user interface including a free-form visual element and a plurality of graphical user interface (GUI) controls, wherein each GUI control of the plurality of GUI controls is associated with a GUI control type, and wherein each GUI control includes one or more GUI controller attributes that define a functional property that is implemented at runtime;
        receiving input indicative of a selection a GUI control of the plurality of GUI controls to associate with the free-form visual element;
        generating executable instructions from a generic code template, wherein the executable instructions define at least one of the one or more GUI controller attributes of the selected GUI control;
        adapting the generated executable instructions to a data structure representing the free-form visual element by replacing one or more tagged attributes of the executable instructions with generated code specific to the free-form visual element; and
        attaching the adapted executable instructions to the data structure representing the free-form visual element to create a free-form visual user interface element, wherein the free-form user interface element has the same visual appearance as the free-form visual element associated with the selected GUI control, wherein the free-form user interface element is configured to execute, at runtime, the adapted executable instructions to implement the functional property associated with the selected GUI control.

10. The system of claim 9, wherein the operations further include:
    defining at least one gesture that is indicative of the selection of the GUI control.

11. The system of claim 10, wherein the at least one gesture includes a drag and drop gesture.

12. The system of claim 9, wherein the one or more GUI controller attributes comprises an accessibility function supporting interaction with an accessibility framework as a control of the GUI control type.

13. The system of claim 9, wherein the free-form visual element comprises a node in a scene graph.

14. A computer-program product tangibly embodied in a non-transitory machine-readable storage medium, including instructions configured to cause one or more processors to perform actions including:
    facilitating a display, by a computing system, of a user interface including a free-form visual element and a plurality of graphical user interface (GUI) controls, wherein each GUI control includes one or more GUI controller attributes that define a functional property of the GUI control executes at runtime, wherein each GUI control of the plurality of GUI controls is associated with a user interface control type, and wherein the free-form visual element is represented as a node in a scene graph;

receiving, by the computing system, input indicative of a selection of a GUI control of the plurality of GUI controls;

generating, by the computing system, executable instructions from a generic code template, wherein the executable instructions define GUI controller attributes of the selected GUI control;

adapting, by the computing system, the executable instructions to a data structure representing the free-form visual element by replacing tagged attributes of the executable instructions with generated code specific to the free-form visual element; and attaching, by the computing system, the adapted executable instructions to the data structure representing the free-form visual element to create a visual user interface element, wherein the free-form user interface element has the same visual appearance as the free-form visual element associated with the selected GUI control, wherein the free-form user interface element is configured to execute, at runtime, the adapted executable instructions to implement the functional property associated with the selected GUI control.

15. The computer-program product of claim 14, wherein the actions further include defining at least one gesture that is indicative of the selection of the GUI control.

16. The computer-program product of claim 15, wherein the gesture includes a drag and drop gesture.

17. The computer-program product of claim 14, wherein a set of GUI controller attributes defining the GUI control comprises accessibility functions supporting interaction with an accessibility framework as a control of the user interface control type.

18. The computer-program product of claim 14, wherein the scene graph comprises multiple nodes in a tree data structure, and wherein operations executed on a parent node of the scene graph are executed on child nodes of the parent node.

* * * * *

UNITED STATES PATENT AND TRADEMARK OFFICE
CERTIFICATE OF CORRECTION

| | |
|---|---|
| PATENT NO. | : 9,703,443 B2 |
| APPLICATION NO. | : 12/237862 |
| DATED | : July 11, 2017 |
| INVENTOR(S) | : Korn |

It is certified that error appears in the above-identified patent and that said Letters Patent is hereby corrected as shown below:

In the Drawings

On sheet 3 of 3, in Fig-4, under Reference Numeral 36g, Line 2, delete "yoru" and insert -- your --, therefor.

In the Claims

In Column 7, Line 22, in Claim 1, after "method" delete "of".

Signed and Sealed this
Thirteenth Day of February, 2018

Andrei Iancu
*Director of the United States Patent and Trademark Office*